United States Patent [19]

Laprade

[11] Patent Number: 4,988,867
[45] Date of Patent: Jan. 29, 1991

[54] SIMULTANEOUS POSITIVE AND NEGATIVE ION DETECTOR

[75] Inventor: Bruce N. Laprade, Holland, Mass.

[73] Assignee: Galileo Electro-Optics Corp., Sturbridge, Mass.

[21] Appl. No.: 432,530

[22] Filed: Nov. 6, 1989

[51] Int. Cl.⁵ .............................................. H01J 49/00
[52] U.S. Cl. ..................................... 250/281; 250/282; 250/283; 250/397; 313/103 CM; 313/105 CM
[58] Field of Search ................ 250/281, 397, 396 ML, 250/282, 299, 283; 313/103 CM, 105 CM

[56] References Cited

U.S. PATENT DOCUMENTS

| | | | |
|---|---|---|---|
| 3,849,692 | 11/1974 | Beasley et al. | 313/105 CM |
| 4,266,127 | 5/1981 | Chang | 250/281 |
| 4,423,324 | 12/1983 | Stafford | 250/281 |
| 4,568,853 | 2/1986 | Boutot | 313/105 CM |
| 4,611,118 | 9/1986 | Managadze | 250/281 |
| 4,639,301 | 1/1982 | Doherty et al. | 250/396 ML |
| 4,714,861 | 12/1987 | Tosswill | 313/105 CM |
| 4,766,312 | 8/1988 | Fergusson et al. | 250/281 |
| 4,810,882 | 3/1989 | Bateman | 250/299 |
| 4,825,118 | 4/1989 | Kyushima | 313/103 CM |
| 4,868,394 | 9/1989 | Fukuhara et al. | 250/397 |

FOREIGN PATENT DOCUMENTS 0851549  7/1981  U.S.S.R. ...................... 250/214 AL

Primary Examiner—Jack I. Berman
Assistant Examiner—Kiet T. Nguyen

[57] ABSTRACT

A simultaneous positive and negative ion detector including a microchannel plate having segments which are biased to attract positively and negatively charged particles.

6 Claims, 2 Drawing Sheets

SIMULTANEOUS POSITIVE AND NEGATIVE ION DETECTOR

FIELD OF THE INVENTION

The invention relates to devices for detecting ions.

BACKGROUND OF THE INVENTION

It is known to detect positive and negative ions by using a conversion anode to convert ions to secondary particles and then using a continuous dynode electron multiplier to provide a signal indicative of the abundance of ions. Stafford U.S. Pat. No. 4,423,324 discloses such a detector which may output a signal indicating the total of all positive and negative ions or may be multiplexed to produce a signal sequentially proportional to positive and then negative ions.

It is also known to provide microchannel plates with distinct electrode patterns such as distinct strips. In operation, the strips are sequentially activated to provide a sequential view of particle position.

SUMMARY OF THE INVENTION

It has been discovered that providing a microchannel plate with segments which are biased to positive and negative potential at the input of the MCP advantageously provides an ion detector which can simultaneously detect positive and negative ions.

PREFERRED EMBODIMENT

The drawings illustrate the preferred embodiment, the structure and operation of which is then described.

DRAWINGS

Structure

Figure 1:
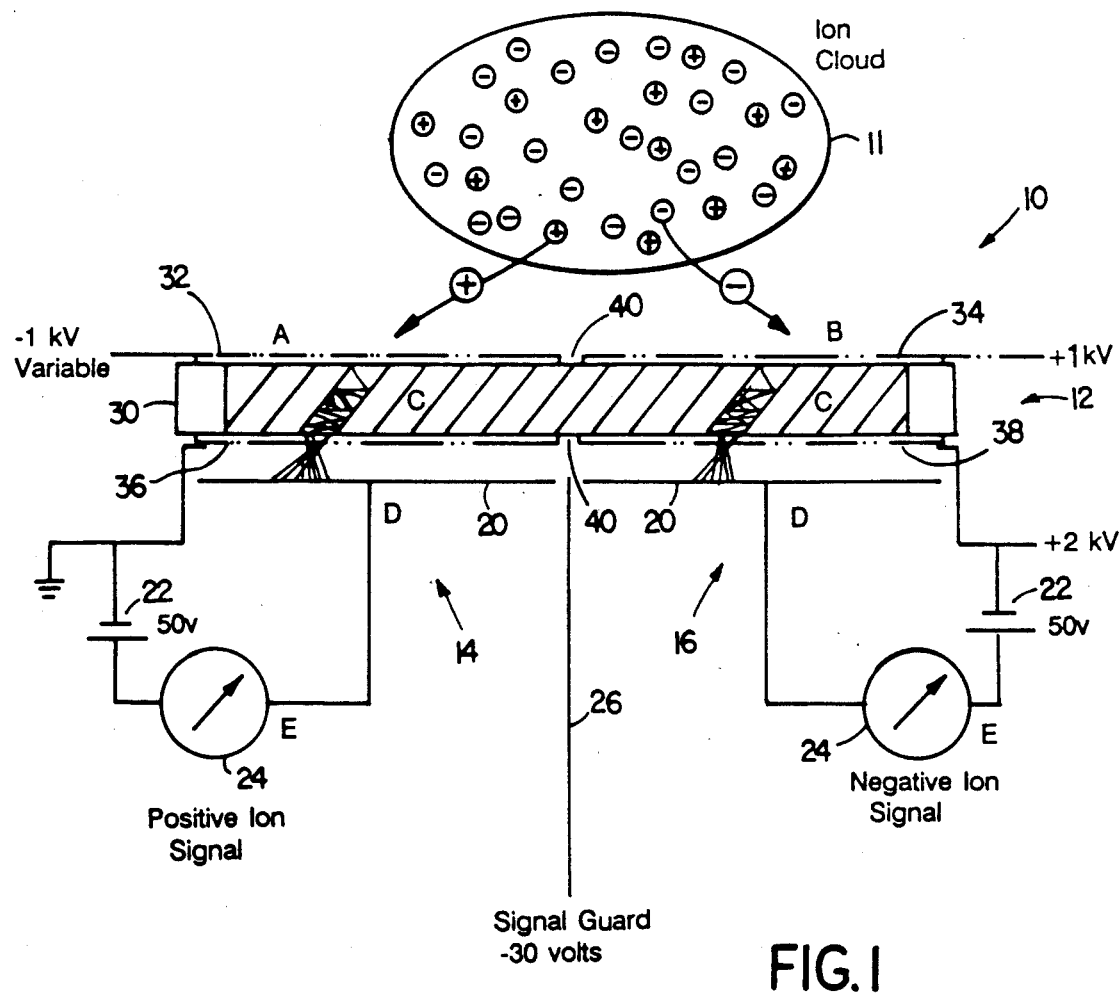
FIG. 1 shows a diagrammatic, schematic view of a simultaneous positive and negative ion detector system according to the invention.
Figure 2:
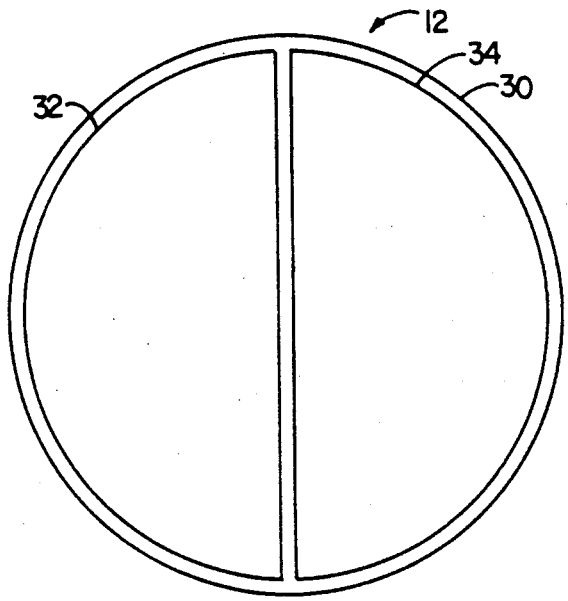
FIG. 2 shows a top plan view of the FIG. 1 ion detector.

Referring to FIGS. 1 and 2, simultaneous positive and negative ion detector system 10 for detecting positive and negative ions contained in ion cloud 11 includes simultaneous positive and negative ion detector 12 which outputs signals to positive collector 14 and negative collector 16. Collectors 14, 16 each include electrically conductive anode 20, voltage supply 22 and output device 24 (an electrometer). Signal guard 26 is positioned between anodes 20, 20.

Positive and negative ion detector 12 includes microchannel plate (MCP) 30 having two electrically conductive metallic (Inconel) input segments 32, 34 at MCP's 30 input locations and two output electrically conductive metallic (Inconel) segments 36, 38 at MCP 30 output locations. Between segments 32 and 34, as between segments 36, 38, is high resistance portion 40 (a gap that is large enough to maintain the potential difference between the segments).

Operation

Referring to FIGS. 1 and 2, simultaneous positive and negative ion detector system 10 is positioned to detect ions from ion cloud 11, which contains a combination of positive and negative ions. Input segments 32, 34 are biased to −1 kv and +1 kv, respectively, for attracting positive and ions, respectively. Additionally, output segments 36, 38 are biased at ground and +2 kv, respectively, to draw electrons generated by impacting ions through MCP 30, thus providing amplified output signals to anodes 20, 20 of collectors 14, 16. Each anode is biased to a voltage which is 50 volts more positive than that of its respective output segment 36, 38 by providing voltage supplies 22 in series with the voltage provided to output segments 36, 38.

Because detector 12 is simultaneously appropriately biased, system 10 may advantageously simultaneously detect positive and negative ions. Because MCP 30 is used, the detected ions may be simultaneously converted and amplified. Because separate output devices 24 are provided, the relative quantity of positive and negative ions may be simultaneously outputted.

Other Embodiments

Other embodiments are within the following claims.

Figure 3:
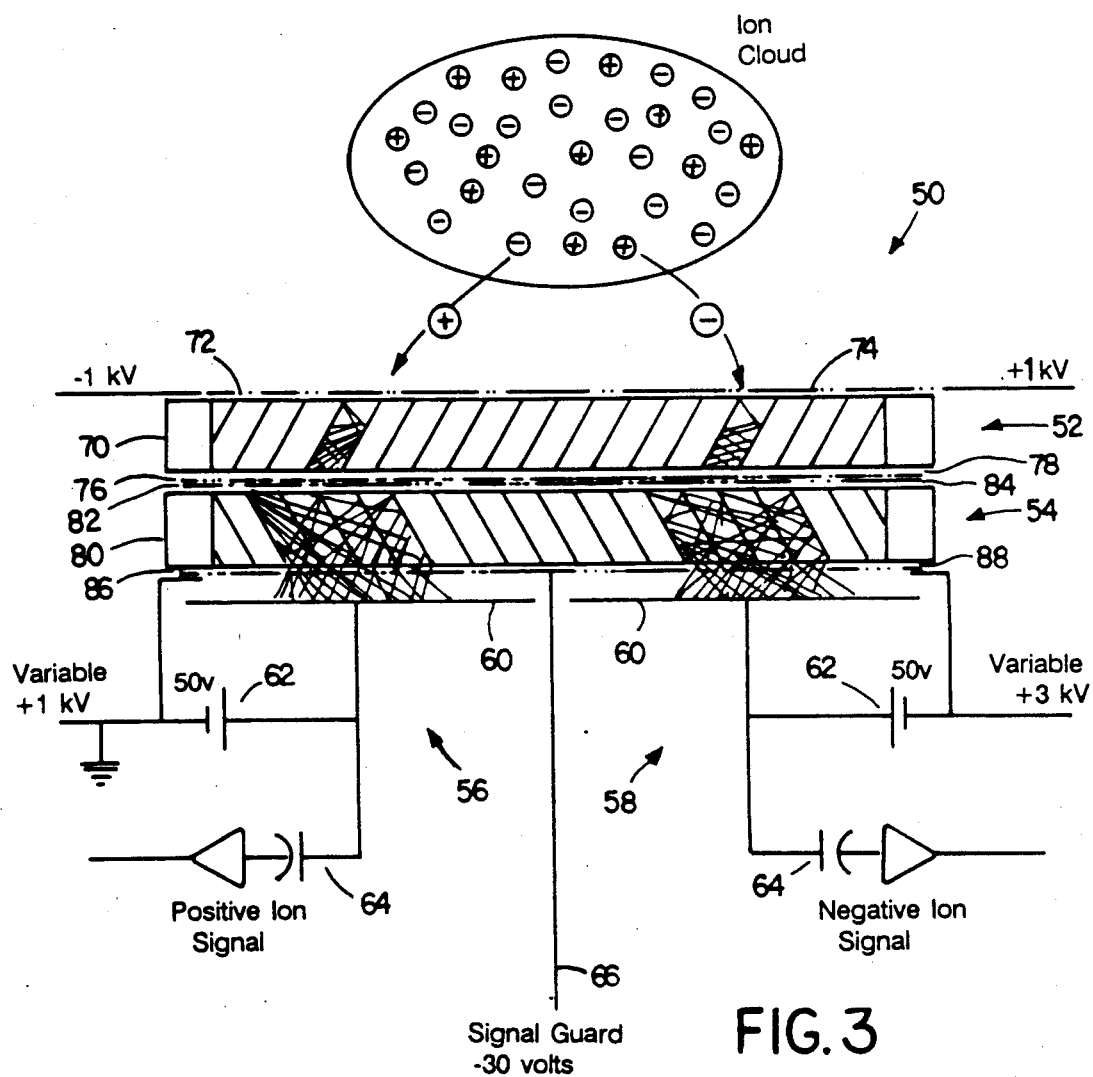
FIG. 3 shows a diagrammatic, schematic view of an alternate simultaneous positive and negative ion detector system.

FIG. 3 shows a pulse counting simultaneous positive and negative ion detection system 50 which includes two cascaded, simultaneous positive and negative ion detectors 52, 54, positive collector 56 and negative collector 58. Collectors 56, 58 include metal anodes 60, 60, voltage supplies 62, 62 and output circuitry 64, 64 which provides outputs to a controller (not shown). Collectors 56, 58 are electrically separated by signal guard 66. Detector 52 includes MCP 70, electrically conductive metallic input segments 72, 74 and electrically conductive metallic output segments 76, 78. Detector 54 includes MCP 80, electrically conductive metallic input segments 82, 84 and electrically conductive metallic output segments 86, 88. In operation detectors 52, 54 are appropriately biased. More specifically, input segment 72 is biased to −1 kv, output segment 76 and input segment 82 are biased to ground and output segment 86 is biased to +1 kv; also, input segment 74 is biased to +1 kv, output segment 78 and input segment 84 are biased to +2 kv and output segment 88 is biased to +3 kv. The voltage of output segments 86, 88 is variable. Metal anodes 60, 60 of collectors 56, 58 are also appropriately biased to a voltage which is 50 volts higher than that of respective output segments 86, 88. The bias of input segments 72, 74 causes positive ions to be attracted to segment 72 and negative ions to be attracted to segment 74.

Also, other collectors used by detection systems 10 and 50 may be apparent to those skilled in the art. E.g., a scintillator/photo-diode combination may be used in place of the metal anode.

Also, other charged particles, e.g., electrons, may be detected by system 10.

A multiplicity of detector-amplifier-collector units, rather than just two as shown, may be integrally arranged, to decrease lateral particle movement required.

I claim:

1. An apparatus for simultaneously detecting positively and negatively charged particles from a source of said particles comprising
   a detector including first and second microchannel plate (MCP) sections that have input locations that are generally parallel to each other and both face said source of particles, and
   a plurality of input segments, at least one input segment being located on said first MCP section and biased to attract said positively charged particles, at least one input segment being located on said second MCP section and biased to attract said negatively charged particles, said detector providing simultaneously positive and negative outputs indicating said attracted separated positively and negatively charged particles.

2. The apparatus of claim 1 wherein said first MCP section and said second MCP section are provided on the same MCP.

3. The apparatus of claim 1 further comprising a first collector configured to receive said positive output, and a second collector configured to receive said negative output.

4. The apparatus of claim 1 further comprising a high resistance portion between said at least one segment biased to attract positively charged particles and said at least one segment biased to attract negatively charged particles.

5. The apparatus of claim 2 further comprising a plurality of output segments, each of said output segments being at a voltage more positive than its respective input segment.

6. The apparatus of claim 2 further comprising a second MCP, and a second plurality of input segments, said second plurality of input segments being positioned between said MCP and said second MCP, at least one second segment being biased to attract said positively charged particles, at least one second segment being biased to attract said negatively charged particles.

* * * * *